United States Patent [19]

Revis et al.

[11] Patent Number: 4,782,040
[45] Date of Patent: Nov. 1, 1988

[54] POROUS MATERIALS HAVING A DUAL SURFACE

[75] Inventors: Anthony Revis, Ames, Iowa; Dwight E. Williams, Midland, Mich.

[73] Assignee: Dow Corning Corporation, Midland, Mich.

[21] Appl. No.: 598,120

[22] Filed: Apr. 9, 1984

[51] Int. Cl.⁴ .................... B01J 20/32; B01J 20/22; B01D 15/08; B32B 5/14
[52] U.S. Cl. ........................ 502/401; 55/386; 210/198.2; 210/198.3; 210/656; 252/184; 427/54.1; 427/387; 428/44; 428/405; 428/447; 502/5; 502/402
[58] Field of Search .............. 502/401–404, 502/150–158, 159, 5, 405; 210/198.2, 198.3, 656; 55/386; 252/182, 184; 427/387, 54.1; 428/405

[56] References Cited

U.S. PATENT DOCUMENTS

| | | | |
|---|---|---|---|
| 3,207,699 | 9/1965 | Harding | 502/158 |
| 3,839,385 | 10/1974 | Meiller et al. | 502/401 |
| 3,984,349 | 10/1976 | Meiller et al. | 502/401 |
| 4,042,749 | 8/1977 | Sandvig | 427/54.1 |
| 4,071,546 | 1/1978 | Plueddemann | 252/182 |
| 4,298,500 | 11/1981 | Abbott | 210/198.2 |
| 4,336,309 | 6/1982 | Jackel et al. | 427/387 |
| 4,379,931 | 4/1983 | Plueddemann | 502/150 |
| 4,415,631 | 11/1983 | Schutijser | 428/405 |
| 4,495,218 | 1/1985 | Azuma et al. | 427/54.1 |
| 4,512,898 | 4/1985 | Naokumi et al. | 502/402 |

Primary Examiner—Paul E. Konopka
Attorney, Agent, or Firm—Robert L. McKellar

[57] ABSTRACT

Porous materials having a dual surface are disclosed. Also disclosed is a method for their preparation. An example of such a material is a silica gel reacted with a reactive silane intermediate such as $(CH_3)_2Si=O$ and then, with a reactive silane such as

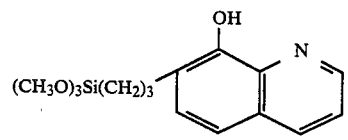

to give a dual treated material having $-((CH_3)_2SiO)_xH$ on the exterior surface and

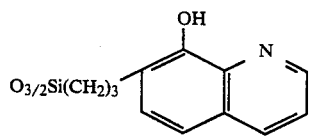

on the interior surface of the pores.

109 Claims, No Drawings

POROUS MATERIALS HAVING A DUAL SURFACE

BACKGROUND OF THE INVENTION

According to Plueddemann, in the chapter on silylating agents in "Encyclopedia of Chemical Technology", 3rd edition, volume 20, page 962 et seq., silylation is the displacement of active hydrogen from an organic molecule by a silyl group. Plueddemann further states that "The active hydrogen is usually OH, NH, or SH, and the silylating agent is usually a trimethylsilyl halide or a nitrogen-functional compound. A mixture of silylating agents may be used; a mixture of trimethylchlorosilane and hexamethyldisilazane is more reactive than either reagent alone, and the by-products combine to form neutral ammonium chloride."

Thus, what Plueddemann has described is what those skilled in the art regard as the "normal way" to silylate organic molecules using reactive silanes.

It has been beneficial to industry to have this approach available to alter organic molecules to achieve certain new molecules. Those skilled in the art have extrapolated silylation of organic molecules to silylation of inorganic molecules as well. For example, it is known that silicas, used as fillers for compounded rubbers, could be treated with reactive silanes such as trimethylchlorosilane and/or hexamethyldisilazane to place trimethylsilyl groups on the surface of such silicas. This treatment arises through the reaction of the hydroxyls on the surface of the silica, with the reactive silanes. See, for example, Hertl, W. and Hair, M. L., "Reaction of Hexamethyldisilazane with Silica", J. of Phys. Chem., Volume 75, No. 14, 1971 and Chmieloweic, J. and Marrow, B. A., "Alkylation of Silica Surfaces", J. of Coll. and Inter. Sci., Volume 94, No. 2, August 1983 and Boksanyi, L., Liardon, O. and Kovats, E., Advances in Coll. and Inter. Sci., 6 (1976), pages 95 to 137.

Particulate support materials used in liquid chromatography applications also benefit by silylation techniques. It is common in this art to use reactive silanes to treat the particulate materials to cover up reactive hydroxyl groups to improve the chromatographic properties of polar molecules. See, for example, L. R. Snyder and J. J. Kirkland, Introduction to Modern Liquid Chromatography, 2nd edition, Wiley Interscience, N.Y. 1979.

A more significant advance in the silylation art came about by the use of reactive silanes, which also contained organofunctional groups, to silylate surfaces. The desired result was to create a material having a novel end-use which was dependent on the type of organofunctional group included in the silylating silane. For example, in U.S. Pat. No. 4,379,931, issued on Apr. 12, 1983, Plueddemann used unique reactive silanes, for example

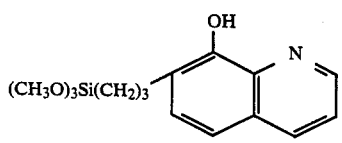

to treat various particulate materials which were then used to extract metal ions from solution.

For most of the practical applications known in the prior art, the preferred form of silylation is that which is carried out in solution. There are, however, some silylation applications wherein the silylation reaction is carried out in the vapor phase. It can be concluded therefore that it is generally known in the art to use various reactive silanes to react with hydroxyls on the surfaces of various materials.

THE INVENTION

What is disclosed in this invention is the use of reactive silane intermediatss to react with the hydroxyls on the exterior surfaces of porous materials and then the use of reactive silanes to react with the hydroxyls on the interior pore surface of the porous materials to provide a dual surface material in the sense that the silicon-containing groups attached to the exterior surface are different than the silicon-containing groups on the interior surface of the porous material.

Further, it is contemplated that the silicon-containing groups covalently bonded to the exterior surface of the porous material will be predominantly those obtained from the reactive silane intermediate while the silicon-containing groups covalently bonded to the interior surface of the porous material will be predominantly those obtained from the reactive silanes.

It is believed by the inventors herein that such dual surface materials are unique, having never been disclosed anywhere in the published literature. Such dual surface materials may be prepared by selecting dual groups that independently adjust transport properties to, and chemical activities of, such dual surface materials.

Thus, it is an object of this invention to provide a process for preparing a composition having a dual surface, the processing comprising (I) contacting a porous material with a highly reactive silane intermediate capable of forming covalent bonds with hydroxyl groups on the exterior surface of the porous material; (II) allowing the mixture from (I) to react, thereby treating the porous material surface; (III) thereafter, contacting and mixing the treated porous material from (II) with a reactive silane, or its hydrolysis product, for a period of time to allow the reactive silane, or its hydrolysis product, to diffuse into the interior of the porous material and covalently bond with hydroxyl groups on the interior surface of the porous material; and (IV) subsequently isolating the dual surface porous material from the mixture of (III).

It is a further object of this invention to provide a composition of matter consisting of a porous material having reacted to its exterior surface, silanol-containing groups which are not silica silanols, and having reacted to the surface of its porous interior, silicon- containing groups which are different from those reacted to the exterior surface.

Thus, the ultimate goal of this invention is to provide a process which will give a composition that has a dual surface. What is meant by "dual surface" for purposes of this invention, is that the silicon-containing groups reacted to the exterior surface of the porous material are different in nature than the silicon-containing groups reacted to the surface of the porous interior of the porous materials.

This goal can be achieved by first reacting the porous material with a small amount of a highly reactive silane intermediate to treat the exterior surface of the porous material with little or no diffusion into the pores and therefore, little or no treatment within the pores by the highly reactive silane intermediate, and then, reacting the so-treated porous material with an excess of a reactive silane and allowing the reactive silane, or its hydrolysis product, to diffuse into the pores and covalently bond to the interior surface.

The major factor that allows the inventive process to produce the inventive compositions herein is that the reactive silane intermediates react very rapidly with the exterior surface hydroxyl and therefore, their physical entry into the pores is severely limited. Additional assistance to prevention of interior reaction is provided by adsorbed water, when present. Even if some of the reactive silane intermediate should reach the interior of the pore before reacting with the exterior surface hydroxyls, it is thought by the inventors that when some physisorbed water is present in the pores, the reactive silane intermediate immediately contacts water in the pores with which it reacts to form disilanols, e.g. $(R)_2Si: + HOH \rightarrow (R)_2Si(OH)_2$ and thus the reactive silane intermediate is prevented from reaching the hydroxyl groups that are situated deep in the interior surface of the pores. Moreover, any newly formed reactive silane intermediate that reaches any pore interior that has previously been the site of the $(R)_2Si: + HOH$ reaction, will immediately encounter the previously formed $(R)_2Si(OH)_2$ which acts as an additional reaction site to react preferentially with the $(R)_2Si:$ to form dimers and other oligomers. A second benefit of adsorbed water is that when present, it can reduce the amount of the reactive silane intermediate precursor that resides in the pores. Hence, the reactive silane intermediate is effectively blocked from the interior of the pores.

In this inventive method then, the first phase of the process requires two steps. The first step, i.e. step (I), requires contacting a porous material with a highly reactive silane intermediate and step (II) requires allowing the highly reactive silane intermediate to react with the porous material to obtain a "treated" porous material. It should be obvious to those skilled in the art that steps (I) and (II) can be carried out simultaneously. Step (III) is then carried out by contacting the "treated" porous material with a reactive silane and allowing the reactive silane, or its hydrolysis product, to diffuse into the pores and react with the hydroxyl therein. Subsequently, the desired end-product is isolated from the reaction mixture by some means.

For purposes of this invention, in steps (I) and (II), the highly reactive silane intermediates are those that are known in the art. Such highly reactive silane intermediates are selected from a group consisting of silenes, silylenes and silanones.

The first group of highly reactive silane intermediates, the silenes are highly unstable organosilicon compounds derived from precursor silanes by various means to be described infra. Their general structure is notable owing to the presence of a single silicon to carbon double bond, i.e. $>Si=CH_2$. The existence of the silenes has been postulated for many years on the basis of the products obtained from certain organosilicon reactions but it has only been recently that such materials were actually isolated so that their existence was proven. See Brook, A. G., Abdesaken, F., Gutekunst, B., Gutekunst, G., and Kallury, R. K., Chem. Comm., 191 (1981). The silenes can be generated from precursor silanes by several different methods, for example by pyrolytic decomposition: Guselnikow, L. E., Flowers, M. C., Chem. Comm., 64 (1967); thermal rearrangement: Slutsky, J., Kwart, H., J. Org. Chem., 38, 3659 (1973); photochemical rearrangement: Nahadaira, Y., Kanovchi, S., Sakurai, H., J. Am. Chem. Soc., 96 5621 (1974); elimination from silyl halides or esters: Jones, P. R., Lim, T. F. O., J. Am. Chem. Soc., 99, 2013 (1977); rearrangement of silyl carbenes: Barton, T. J., Holkman, S. K., J. Am. Chem. Soc. 102 1584 (1980); and, disproportionation of trimethylsilyl radicals: Tokach, S. K., Koob, R. D., J. Am. Chem. Soc., 102, 376 (1980).

Such silenes include, for example,

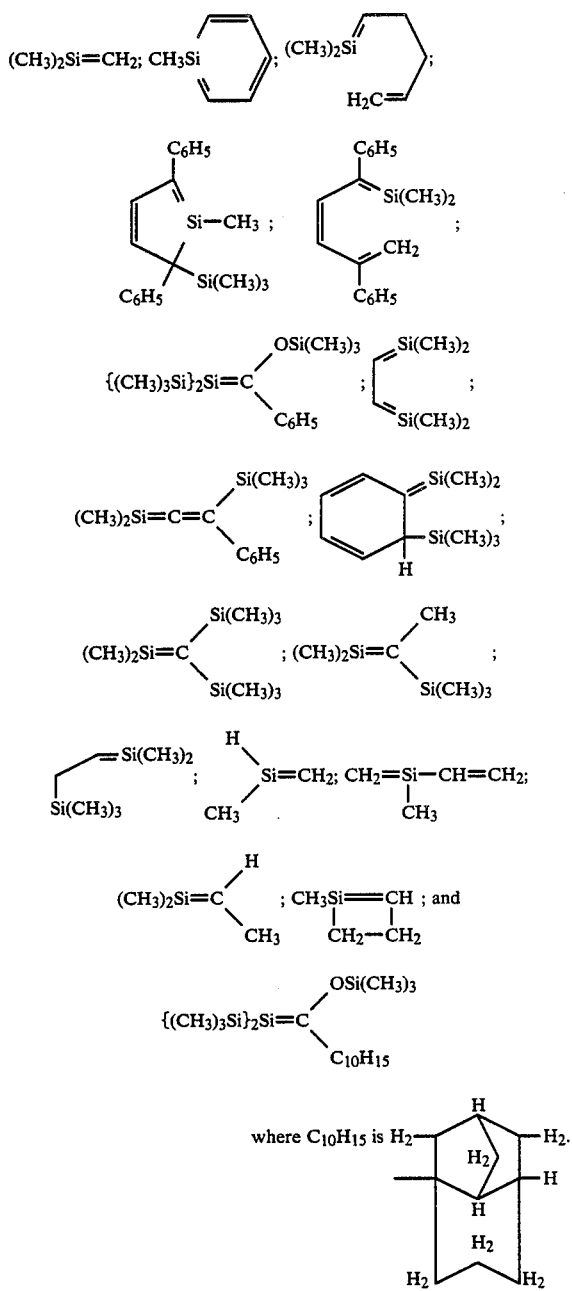

These highly reactive silane intermediates react with the surface hydroxyls of porous materials upon contact with such hydroxyls. Thus, using $(CH_3)_2Si=CH_2$ as an example of a silane, and using $\equiv SiOH$ as the designation for a surface hydroxyl on silica, the following reaction is believed to take place:

$$\equiv SiOH + (CH_3)_2Si=CH_2 \rightarrow \equiv SiOSi(CH_3)_3.$$

Another group of highly reactive silane intermediates useful in this invention are the silylenes. Their general structure is notable owing to the presence of a radical, i.e. >Si:. Silylenes can be formed from disilanes, for example, methoxydisilanes which undergo thermally induced alpha-elimination to produce the organosilylenes.

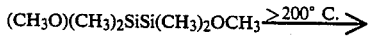

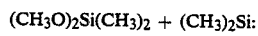

See Atwell, W. H. and Weyenberg, D. R., J. Am. Chem. Soc., 90, 3438 (1968). Such reactive silane intermediates can also be generated via photochemical methods as shown, for example, in Sakurai, H., Kobayashi, Y., and Nahadaira, K., J. Am. Chem. Soc., 93, 5272 (1971).

Such silylenes include, for example,

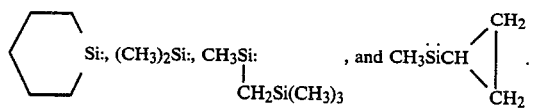

These highly reactive silane intermediates react with the surface hydroxyl of porous materials upon contact with hydroxyls. Thus, using $(CH_3)_2Si$: as an example of a silylene, and $\equiv SiOH$ as the designation for a surface hydroxyl on silica, the following reaction is believed to take place:

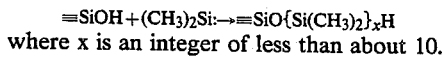

where x is an integer of less than about 10.

Another group of highly reactive silane intermediates useful in this invention are the silanones. Their general structure is notable owing to the presence of a ketonic oxygen, i.e. $>Si=O$ in the molecule. Like the silenes, the silanones are suspected to exist but have never been isolated and identified. However, strong evidence exists that they are present in an operational sense in certain reaction mixtures. See, for example, H. Okinoshima and W. P. Weber, J. Organometal. Chem., 155, 165, (1978) and T. J. Barton and W. D. Wulff, J. Am. Chem. Soc., 101, 2735 (1979).

These highly reactive silane intermediates react with the surface hydroxyls of porous materials upon contact with such hydroxyls. Thus, using $(CH_3)_2Si=O$ as an example of a silanone, and $\equiv SiOH$ as the designation for a surface hydroxyl on silica, the following reaction is believed to take place:

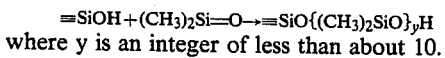

where y is an integer of less than about 10.

The porous materials found useful in this invention are those materials which are porous solids, having hydroxyl groups on their surfaces. Such materials for example are silicas, silica gels, stannia, alumina, titania, zirconia, and the like. Also, these materials can be porous glass, controlled pore glass, controlled pore ceramics or plastic as long as the material has, or will form, hydroxyl groups on its surface.

The form of the porous material is not overly critical. Particulate porous materials, as well as filaments, slabs, discs, blocks, spheres, films and other such forms can be used in this invention. Also contemplated within the scope of this invention is the treatment of particulate materials by the process of this invention, and the subsequent forming of the treated particulate materials into filaments, slabs, discs, blocks, spheres, films, membranes, sheets, and the like.

Preferred for this invention are the porous metalloid and metallic oxides such as silica, alumina, zirconia and titania in all of their related forms. Most preferred are the silicas. Also contemplated within the scope of this invention are porous mixed metallic oxides such as $Na_2O$: $Al_2O_3$:$5SiO_2$:$nH_2O$, wherein n is the moles of water of hydration, and the like.

The first phase of this process is the contacting of the porous material with the reactive silane intermediate. As indicated above, the reactive silane intermediates are formed from silane precursors and one method is to have the porous material be intimately contacted with a solution of the precursor silane so that when the silane precursor generates the reactive silane intermediate, the reactive silane intermediate can immediately contact the exterior surface of the porous material and react with it. Failure to intimately contact the porous material with the silane precursor while the reactive silane intermediate is being formed, results in a wasteful use of the reactants, since the reactive silane intermediate tends to react with itself or with newly formed surface bonds, or reaction container walls. For this method it is preferred that adsorbed water be present in the pores to reduce entry of the silane precursor. This water also reduces the opportunity for the reactive silane intermediate to reach deep into the pores.

Thus, in one method the silane precursor in a solvent solution such as benzene or toluene is intimately contacted with the porous material. If particulate, the porous material is used as a suspension. The reactive silane intermediate is then generated in-situ, for example, by the application of ultraviolet light to the solution, and the reactive silane intermediate makes immediate contact with the exterior surface of the porous material and decreases the chances of ineffective use of the reactive silane intermediate.

In another method, the reactive silane intermediate can be generated in a chamber independent of the liquid dispersion of the porous material and transported by some means to the liquid dispersion of the porous material. For example, the precursor silane in solvent solution can be passed through an irradiation zone where the reactive intermediates are generated and the solvent solution flow carries the generated reactive silane intermediates to the porous material. Flow recycling of unexpended precursor silane allows effective utilization of the precursor silane to treat the exterior surface of the porous material.

It is also contemplated within the scope of this invention to carry out the first phase of the process in a vapor phase. Thus, in a third method the precursor silane is placed in a chamber and contacted with the equilibrium vapor of the reactive silane intermediate. The chamber has two regions, one, an irradiation region and, two, a reaction region. The silane precursor is irradiated in the irradiation region to generate the reactive silane intermediate which moves toward the porous material in a random fashion. The porous material which is also located in the reaction region of the vacuum chamber, and some short distance away from the zone of irradiation, is thereby randomly hit on the exterior surface with the reactive silane intermediate thereby causing a reaction between the reactive silane intermediate and the exterior surface hydroxyls of the porous materials.

In a fourth method, the precursor silane vapor chamber can be equipped to allow a flow of gas, such as helium, to remove the reactive silane intermediate as well as unreacted precursor silane vapor. This helium flow then carries the reactive silane intermediate to the porous material for reaction therewith. These methods and their variations allow for more selective exterior surface treatment, as the excitation used to generate the reactive silane intermediate is not allowed to contact the porous material and, thus, the precursor silane need not be kept out of the pores to prevent reaction with the interior hydroxyls. It is obvious then that the resulting porous material is not generally reacted on the interior surfaces in this phase of the process nor do the pores contain the dihydroxy monomers or oligomers. Thus, when the reactive silane of the second phase, i.e. step (III) of this inventive process, is contacted by the surface treated porous material of steps (I) and (II), only the moiety resulting from the reactive silane will be found on the interior surface of the pores, resulting in a "purer" dual surface material. Steps (I) and (II) can be carried out for a period of time of from 1 minute to 24 hours. Generally, for purposes of this invention it is preferred to carry out steps (I) or (II) over about a 1 to 8 hour time period to ensure that the exterior surface of the porous material is well treated.

The temperature at which steps (I) and (II) are carried out is not narrowly critical and can range from 0° C. to 400° C. Preferred is a room temperature to 200° C. reaction temperature.

The amount of reactve silane intermediate useful in this invention depends on the number of exterior surface hydroxyls to be reacted. Typically, a stoichiometric amount equivalent to the exterior surface hydroxyls plus some excess of the reactive silane intermediate is required to cover all surface hydroxyl because of the potential side reactions involved. Typically, 50 to 1000% excess is used. This excess is with respect to the exterior hydroxyl groups. With respect to the total hydroxyls on both the exterior and interior surfaces, the amount of the reactive silane intermediate amounts to about 0.001 to 1%. When adsorbed water is present in the pores to consume excess amounts of the reactive silane intermediate, much larger amounts of the intermediate are tolerable, up to 100% of the total hydroxyls present. If it is desirable to achieve less than stoichiometric coverage of the surface hydroxyls, then obviously, less reactive silane intermediate should be used.

In the second phase of the process, i.e. step (III), the material obtained by steps (I) and (II) is contacted with a reactive silane. It should be noted that steps (I) and (II) deal with a "reactive silane intermediate" while step (III) deals with a "reactive silane". For purposes of this invention, what is meant by "reactive silane" is that the silane is sluggish in its reactivity such that it will not react with nor displace the newly formed groups on the exterior surface of the porous material but will react with the silica silanols. This reaction is preferably carried out in bulk solution as the reactive silanes are generally neither reactive enough or volatile enough to use as vapors. Thus, the reactants are mixed together in a solvent solution, with or without, heating. The object of step (III) is to allow the hydrolysis and diffusion, or the diffusion and hydrolysis of the reactive silane, in the pores of the porous material. Since the exterior surface hydroxyls of the porous material have been effectively covered by the reactive silane intermediate in steps (I) and (II), the reactive silane does not have available to it the reactive sites on the exterior surface of the porous material. Thus, the reactive silane has only the hydroxyls remaining on the interior surfaces of the porous material available for reaction.

Therefore, step (III) must be carried out for a sufficient period of time to allow for the diffusion of the reactive silane into the pores, and hydrolysis of the silanes therein (or hydrolysis of the silane and then diffusion of the hydrolyzate into the pore to react). Some of the more highly reactive silanes which do not require hydrolysis prior to reaction with the interior hydroxyl groups may also be used as vapors.

Step (III) can be carried out for a period of time of from several minutes to several hours. As indicated above, this phase of the process depends on the rate of hydrolysis of the reactive silane and the rate of diffusion of the silane, or its hydrolysis product, into the pores of the porous material. Preferred for this invention is a reaction time for step (III) of from 10 minutes to 24 hours. Most preferred is a time of 1 to 6 hours.

The temperature at which step (III) is carried out is more critical than steps (I) and (II), yet it is not narrowly critical. As one would expect, increased temperatures enhance the rate of reaction but, increasing the temperature does not appear to promote undesirable side reactions. Thus, the temperature used in step (III) can range from 0° C. to 300° C. Most preferred is the reflux temperature of the reaction mixture at about 70° C. to 120° C.

The amount of reactive silane useful in this invention depends on how many of the surface hydroxyls of the pore interior one wishes to cover. An excess of the reactive silane is not critical as this reactive silane does not displace any of the exterior surface groups obtained by steps (I) and (II). Typically, a stoichiometric quantity, based on reactive hydroxyls of the interior pore surfaces, is used herein.

If the reactive silane is very sluggish (e.g., organosilanol), then the reaction should be catalyzed with acid or base. In the case of the treated porous material having the groups on the exterior surface derived fron silanones, the reaction cannot be catalyzed with acid and must be catalyzed with base, preferably weak base. In the case of the treated porous material having the groups on the exterior surface derived from silenes and silylenes, both acid and base catalysis can be used, with the proviso that the minimum catalysis required for completion of the reaction be used. The time and temperature of such catalyzed silylations must be carefully adjusted by trial and error to attain adequate interior coverage before the displacement of the covalently bound external group begins.

It will be recalled from the foregoing discussion that dihydroxy compounds and oligomers can reside in the interiors of the pores. This is true as long as there is an absence of catalysts. It is known by the inventors herein that the introduction of the reactive silane in this third step, tends to displace these dihydroxy compounds and oligomers from the pore interior and that such displacement did not occur on the exterior surface of the porous material. The process therefore appears to give dual surface compositions.

The reactive silanes useful in step (III) of this invention are those silanes which are recognized as conventional silylation reagents. This group includes such silanes as alkoxysilanes, chlorosilanes, acetoxysilanes, alkyldisiloxanes, silylamines, silylamides, silylthioethers and many others. Preferred for this invention are alkoxysilanes, silylamides, and silylamines.

Specific silanes which are useful herein include: trimethylchlorosilane; dimethyldichlorosilane; hexamethyldisilazane; N,N'-bis(trimethylsilyl)urea; N-trimethylsilyldiethylamine; N-trimethylsilylimidazole; N,O-bis(trimethylsilyl)acetamide; N,O-bis(trimethylsilyl)trifluoroacetamide; N-methyl-N-trimethylsilyltrifluoroacetamide; t-butyldimethylsilylimidazole; N-trimethylsilylacetamide; N-trimethylsilylpiperidine; hexamethyldisilthiane; O-trimethylsilylacetate; O-trimethylsilyltrifluoroacetate; N-trimethylsilyldimethylamine; N-trimethylsilylmorpholine; N-trimethylsilylpyrrolidine; and N-trimethylsilylacetanilide. In addition, silanes having desirable functional groups may also be used. For example, such silanes as N-(vinyldimethylsilyl)N-methylacetamide is an excellent silane to use in this invention because it leaves the vinyldimethylsilyl group on the interior surface of the porous material. The vinyl group is valuable because once the vinyl group is attached to the interior surface of the porous material, conventional reactions can be used to add to the vinyl group thus creating yet another type of group on the interior surface of the porous material. For example, when the porous material is treated with N-(vinyldimethylsilyl)N-methylacetamide, one can add $HSCH_2COOH$ to the resulting vinyl dimethyl silyl to give a surface group such as $HOOCCH_2S(CH_2)_2(CH_3)_2SiOSi\equiv$. Using bis(dimethylsilyl)N-methylacetamide gives a surface treatment such as $H(CH_3)_2SiOSi\equiv$ which can also be further reacted with unsaturated molecules to provide further modifications to the interior surface of the porous material.

Yet another aspect of this invention is the use in step (III) of organosilanes to silylate the porous material. Such silanes useful in this invention include, for example, (alpha-methacryloxypropyl)trimethoxysilane; (4-aminopropyl)triethoxysilane; {gamma-(beta-aminoethylamino)-propyl}trimethoxysilane; (gamma-glycidoxypropyl)trimethoxysilane; {beta-(3,4-epoxycyclohexyl)-ethyl}trimethoxysilane; (beta-mercaptoethyl)trimethoxysilane; (gamma-mercaptopropyl)trimethoxysilane; (gamma-chloropropyl)trimethoxysilane;

$CH_2=CHC_6H_4CH_2NH(CH_2)_2NH(CH_2)_3Si(OCH_3)_3 \cdot HCl$;

$(CH_3O)_3Si(CH_2)_3\overset{\oplus}{N}(CH_3)_2C_{18}H_{37}Cl^-$;

$(CH_3O)_3Si(CH_2)_3\overset{\oplus}{N}(CH_3)_2C_{12}H_{25}Cl^-$;

$(CH_3O)_3Si(CH_2)_3\overset{\oplus}{N}CH_3(C_{12}H_{25})_2Cl^-$;

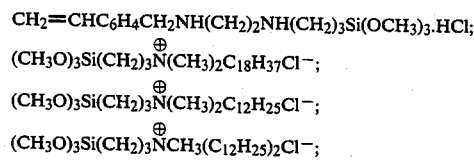

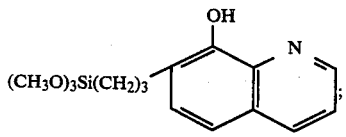
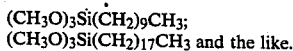 and the like.

When it is determined that the reaction in step (III) is essentially finished, the product is typically isolated from the reaction mixture. Thus, step (IV) of this process is the isolation of such products from the reaction mixture. This can be accomplished in a number of ways. For example, the liquid can be decanted, the porous material washed and the liquid decanted successively or, the reaction mixture can be filtered to remove the liquid from the solid product. The final product can be used in this form or it can be dried. If the material is in a particulate form it can be used as is or it can be compressed, sintered, or otherwise formed.

It is also contemplated within the scope of this invention to prepare a dual-surface porous material by eliminating step (III) of the defined process. The elimination of step (III) of the process results in an "intermediate" product wherein the surface of the porous material is first treated by steps (I) and (II) to provide a treated porous material having $(CH_3)_3SiO$, $H\{(CH_3)_2Si\}_xO$ or $H\{OSi(CH_2)_2\}_yO$ on the exterior surface and hydroxyl groups on the interior pore surface.

Thus, this invention also consists of a method of preparing a dual surface, porous material which comprises:

(A) contacting a porous material with a highly reactive silane intermediate capable of forming covalent bonds with hydroxyl groups on the exterior surface of the porous material;

(B) allowing the mixture from (A) to react thereby treating the porous material exterior surface;

(C) subsequently isolating the dual surface porous material from the mixture of (B).

These intermediates are useful products for the method disclosed supra for providing dual surface materials using reactive silanes to treat the interior pore surfaces.

It is a further object of this invention to provide a composition of matter consisting of a porous material having reacted to its exterior surface, silanol-containing groups which are not silica-silanols and whose interior pore surface contains silica-silanol or other hydroxyl groups different from the exterior groups.

The dual-surface porous materials of this invention are useful for chelating metals from solution and high performance liquid chromatography methods (see Instrumental Methods of Analysis, Sixth edition, Willard, H. H., Merritt, Lynne L. Jr., Dean, John A. and Settle, F. A., Jr. D. Van Nostrand Co., N.Y. 1981, pages 529–564). The materials, whose surfaces bear groups capable of further modification, such as $H(CH_3)_2SiO-$ and $CH_2=CH(CH_3)_2SiO-$, are useful intermediates in the preparation of other surface-modified porous materials. Such modifiable groups are particularly valuable when on the exterior surface.

Now, so that those skilled in the art may appreciate and understand the invention described herein, the following examples are offered for illustration purposes only. The examples should not be construed as limiting the invention as defined in the claims.

EXAMPLE 1

A porous particulate $SiO_2$ with a mesh size of 60–200 on U.S. standard sieves, having a surface area of approximately 300 $m^2/g$ and an average of 60 angstrom units pore size, purchased from J. T. Baker Co., Phillipsburg, N.J., as Cat. No. 3405-1 was dried for 2 hours at 110° C. in an air convection oven to remove excess water, but not completely remove adsorbed water from the material. Into a two-necked, 50 ml. round bottomed glass flask, there was placed 1.0181 gms. of the dried $SiO_2$, 0.5541 gms. of dodecamethylcyclohexasilane and 14 mols of dry benzene, all under an argon blanket. This solution was stirred and irradiated at room temperature using a Rayonet ® ultraviolet light source at 2537 angstrom units (Rayonet photochemical reactor manufactured by Southern New England Ultraviolet Company, Hamden, Conn., U.S.A). After about 5 hours, a gas-liquid chromatograph analysis showed that about 50% of the cyclic silane had been consumed. At this point, apparently no higher molecular weight oligomers had formed as evidenced by the lack of elution of the same on the chromatograph. After about 20 hours of total irradiation, the cyclic silane had been totally used up. The product mixture was filtered and washed with dry reagent toluene. A yellow-colored polymeric substance coated on the surface of the silica was removed by washing with dry heptane followed by a wash with pure ethanol. The solid product was then dried in an air-circulating oven for 2 hours at 60° C.

An untreated sample of the $SiO_2$ used in this example was analyzed for carbon content and it was found to contain 0.12 weight percent carbon while the treated $SiO_2$ of this example showed 4.76 weight percent carbon. Bulk analysis thus indicates that there is present 1.98 m mole of $H(CH_3)_2Si$/gm of $SiO_2$. The larger portion of $H(CH_3)_2Si$ was subsequently displaced as discussed infra. The precursor silane is excluded from the pore regions of the particles by virtue of such region's high polarity and preferential adsorption of water rather than non-polar compounds such as, for example, toluene.

EXAMPLE 2

The treated product from example 1 was subjected to a second treatment using $(CH_3O)_3Si(CH_2)_3NH(CH_2)_2NH_2$ by mixing 0.1 gms. of the treated material from example 1 with a 5 weight percent dry toluene solution of the silane (0.08 ml in 1.42 ml dry toluene). After about one and one-half hours of refluxing under nitrogen, the reaction was cooled and the gel separated by filtration and washed with reagent grade toluene and dried in an air-circulating oven at 60° C. for two hours.

This material when analyzed by a comparison of bulk elemental analysis (%C and %N) with surface elemental analysis by ESCA (Electron Spectroscopy for Chemical Analysis) showed the following for the treated $SiO_2$:

The ratio of $O_{3/2}Si(CH_2)_3NH(CH_2)_2NH_2$ groups to

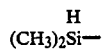

groups equalled 0.88 for the interior surface and 0.29 for the exterior surface. Thus, this comparison shows that the interior surface of the silica has predominantly more $O_{3/2}Si(CH_2)_3NH(CH_2)_2NH_2$ moieties than $(CH_3)_2HSi-$ moieties, while the reverse is true on the exterior surface. Hence, a dual-natured porous material had been achieved.

Conditions were not optimized for obtaining complete exclusion of the interior silane moiety, $O_{3/2}Si(CH_2)_3NH(CH_2)_2NH_2$, from the exterior surface, but as the analysis indicates, the $(CH_3)_2HSi-$ moiety predominates. The bulk elemental analysis (%C and %N) before and after the reactive silane treatment shows that silylation of the particles was accompanied by displacement of about half of the $(CH_3)_2HSi-$ moiety from the interior pore regions. Such major displacement did not occur on the exterior surface. This suggests, but the inventors are deemed not to be held to such a theory, that easily displaced, hydrogen-bonded $(CH_3)_2Si(OH)_2$ and its oligomers were formed and are present in the pores. Such species form easily by the reaction of $(CH_3)_2Si=$ with pore water and are not themselves very reactive with silica silanols in the absence of catalysts. Thus, this theory explains in part why the surface of the particulate material is preferentially treated over the interior surface, when contacted with the reactive silane intermediate.

EXAMPLE 3

The treated material from example 2 was shown to be able to chelate copper ions from a copper sulfate solution. Upon contacting the copper solution, the white powder changed to a deep blue color characteristic of copper fully bound to the entire porous surface of silica whereas ESCA detected only minor amounts of exterior surface copper.

That which is claimed is:

1. A method of preparing a dual surface, porous material which comprises
   (I) contacting a porous material with a reactive silane intermediate capable of forming covalent bonds with hydroxyl groups on the exterior surface of the porous material wherein said reactive silane intermediate is selected from a group consisting essentially of (i) silenes; (ii) silylenes and (iii) silanones;
   (II) allowing the mixture from (I) to react thereby treating the porous material exterior surface;
   (III) thereafter, contacting and mixing the treated porous material from (II) with a reactive silane, or its hydrolysis product, for a period of time to allow the reactive silane, or its hydrolysis product, to diffuse into the interior of the porous material and covalently bond with hydroxyl groups on the interior surface of the porous material, and
   (IV) subsequently isolating the dual surface porous material from the mixture of (III).

2. A method as claimed in claim 1, wherein in step (I), the reactive silane intermediate is contacted with a liquid suspension of the porous material.

3. A method as claimed in claim 1, wherein a solution of reactive silane intermediate is brought into contact with non-particulate porous material.

4. A method as claimed in claim 1, wherein in step (I), the reactive silane intermediate in the vapor phase is intimately contacted with the porous material.

5. A method as claimed in claim 1, wherein in step (I), a solution of a precursor to the reactive silane intermediate is brought into contact with the porous material before the reactive silane intermediate is formed.

6. A method as claimed in claim 1, wherein in step (I), a solution of the reactive silane intermediate is brought into contact with the porous material after the reactive silane intermediate is formed.

7. A method as claimed in claim 5, wherein in step (I), adsorbed water is used to reduce entry of precursors into pores.

8. A method as claimed in claim 5, wherein in step (II), adsorbed water is used to destroy that portion of the reactive silane intermediate which would otherwise reach and treat the interior hydroxyls.

9. A method as claimed in claim 1, wherein the reactive silane intermediate is generated at a site different than the site of the porous material and the reactive silane intermediate is transported from the generation site to the porous material site.

10. A method as claimed in claim 9, wherein the reactive silane intermediate is transported by its own vapor pressure.

11. A method as claimed in claim 9, wherein the reactive silane intermediate is transported by a carrier liquid.

12. A method as claimed in claim 9, wherein the reactive silane intermediate is transported by a carrier gas.

13. A method as claimed in claim 1, wherein in step (III), the product from step (II) is contacted with the reactive silane in solution.

14. A method as claimed in claim 1 wherein in step (III), the product from step (II) is contacted with the reactive silane when the reactive silane is in the vapor phase.

15. A method as claimed in claim 1 wherein steps (I) and (II) are carried out at a temperature in the range of 0° C. to 400° C.

16. A method as claimed in claim 1 wherein steps (I) and (II) are carried out at a temperature in the range of 25° C. to 200° C.

17. A method as claimed in claim 1 wherein step (III) is carried out at a temperature in the range of 0° C. and 300° C.

18. A method as claimed in claim 1 wherein step (III) is carried out at a temperature in the range of 70° C. to 120° C.

19. A method as claimed in claim 1 wherein the reactive silane intermediates of step (I) are silenes.

20. A method as claimed in claim 19 wherein the silene is $(CH_3)_2Si=CH_2$.

21. A method as claimed in claim 19 wherein the silene is

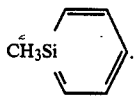

22. A method as claimed in claim 19 wherein the silene is $(CH_3)_2Si=CHCH_2CH_2CH=CH_2$.

23. A method as claimed in claim 19 wherein the silene is

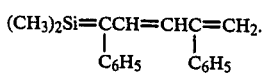

24. A method as claimed in claim 19 wherein the silene is $(CH_3)_2Si=CHCH=Si(CH_3)_2$.

25. A method as claimed in claim 19 wherein the silene is

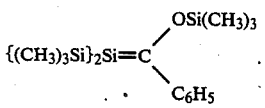

26. A method as claimed in claim 19 wherein the silene is

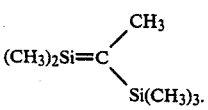

27. A method as claimed in claim 19 wherein the silene is

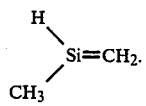

28. A method as claimed in claim 19 wherein the silene is

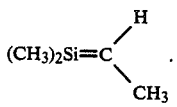

29. A method as claimed in claim 19 wherein the silene is

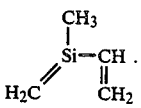

30. A method as claimed in claim 19 wherein the silene is

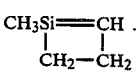

31. A method as claimed in claim 1 wherein the reactive silane intermediates of step (I) are silylenes.

32. A method as claimed in claim 31 wherein the silylene is

33. A method as claimed in claim 31 wherein the silylene is $(CH_3)_2Si$:.

34. A method as claimed in claim 31 wherein the silylene is

35. A method as claimed in claim 31 wherein the silylene is

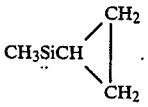

36. A method as claimed in claim 1 wherein the reactive silane intermediates of step (I) are silanones.

37. A method as claimed in claim 36 wherein the silanone is $(CH_3)_2Si=O$.

38. A method as claimed in claim 36 wherein the silanone is $$\underset{\underset{C_6H_5}{|}}{CH_3Si}=O.$$

39. A method as claimed in claim 19 wherein the reactive silane of step (III) has the general formula $$(R'O)_a(R'')_bSiQ_c$$

wherein R' is an alkyl radical having 1 to 4 carbon atoms or hydrogen R'' is an alkyl radical of 1 to 4 carbon atoms or phenyl; the value of a is 1, 2 or 3; the value of b is 0, 1 or 2; the value of c is 1 or 2 wherein a+b+c equals 4; Q is a radical selected from a group consisting of (a) —CH$_2$CH$_2$CH$_2$OC(O)C(CH$_3$)=CH$_2$;
(b) —CH$_2$CH$_2$CH$_2$NH$_2$;
(c) —CH$_2$CH$_2$CH$_2$NHCH$_2$CH$_2$NH$_2$;

(d) —CH$_2$CH$_2$CH$_2$OCH$_2$CHCH$_2$;
  $\phantom{xxxxxxxxxxxxxxxx}\underset{O}{\underbrace{\phantom{xxxx}}}$ (e) —CH$_2$CH$_2$CH$_2$

(f) —CH$_2$CH$_2$CH$_2$SH;
(q) —CH$_2$CH$_2$CH$_2$Cl;
(h) —CH$_2$CH$_2$CH$_2$NHCH$_2$CH$_2$NHCH$_2$C$_6$H$_4$CH=CH$_2$.HCl;
(i) —CH$_2$CH$_2$CH$_2$$\overset{\oplus}{N}$(CH$_3$)$_2$C$_{18}$H$_{37}$Cl$^-$;
(j) —CH$_2$CH$_2$CH$_2$$\overset{\oplus}{N}$CH$_3$(C$_{12}$H$_{25}$)$_2$Cl$^-$;

(k) —(CH$_2$)$_3$

(l) alkyl group of less than twenty carbon atoms, and
(m) aryl group of less than twelve carbon atoms.

40. A method as claimed in claim 39 wherein Q is —(CH$_2$)$_3$NH)CH$_2$)$_2$NH$_2$.

41. A method as claimed in claim 39 wherein Q is —(CH$_2$)$_3$NH$_2$.

42. A method as claimed in claim 39 wherein Q is

—(CH$_2$)$_3$OCH$_2$CHCH$_2$.
  $\phantom{xxxxxxxxxx}\underset{O}{\underbrace{\phantom{xxxx}}}$ 43. A method as claimed in claim 39 wherein Q is —(CH$_2$)$_3$N$^\oplus$(CH$_3$)$_2$C$_{18}$H$_{37}$Cl$^-$.

44. A method as claimed in claim 39 wherein Q is —(CH$_2$)$_9$CH$_3$.

45. A method as claimed in claim 39 wherein Q is —(CH$_2$)$_{17}$CH$_3$.

46. A method as claimed in claim 19 wherein the reactive silane in step (III) is selected from a group consisting of N,N-disubstituted amidosilanes and N,O-disubstituted amidosilanes.

47. A method as claimed in claim 46 wherein the N,N-disubstituted amide is N-trimethylsilyl-N-methylacetamide.

48. A method as claimed in claim 46 wherein the N,O-disubstituted amide is N,O-bis(trimethylsilyl)acetamide.

49. A method as claimed in claim 46 wherein the N,N-disubstituted amido silane is N-trimethylsilyl,N-methyltrifluoroacetamide.

50. A method as claimed in claim 46 wherein the N,O-disubstituted amido silane is N,O-bis(trimethylsilyl)trifluoroacetamide.

51. A method as claimed in claim 46 wherein the N,N-disubstituted amido silane is N-hydrodimethylsilyl-N-methylacetamide.

52. A method as claimed in claim 46 wherein the N,N-disubstituted amido silane is N-vinyldimethylsilyl-N-methylacetamide.

53. A method as claimed in claim 46 wherein the N,N-disubstituted amido silane is N-dimethylalkylsilyl,N-methylacetamide wherein the alkyl group has from 2 to 20 carbon atoms.

54. A method as claimed in claim 46 wherein the N,N-disubstituted amido silane is N-dimethylarylsilyl,N-methylacetamide wherein the aryl group has less than twelve carbon atoms.

55. A method as claimed in claim 19 wherein the reactive silane of step (III) is selected from a group consisting of
  (i) N,N,N-trisubstituted aminosilanes selected from a group consisting of
    (a) aminosilanes having the general formula R$^v_3$SiNR$^{vi}$R$^{vii}$ wherein R$^v$ is independently selected from a group consisting of hydrogen, vinyl, and Q wherein Q is a radical selected from a group consisting of (a) —CH$_2$CH$_2$CH$_2$OC(O)C(CH$_3$)=CH$_2$;
(b) —CH$_2$CH$_2$CH$_2$NH$_2$;
(c) —CH$_2$CH$_2$CH$_2$NHCH$_2$CH$_2$NH$_2$;

(d) —CH$_2$CH$_2$CH$_2$OCH$_2$CH CH$_2$;
  $\phantom{xxxxxxxxxxxxxxx}\underset{O}{\underbrace{\phantom{xxx}}}$ (e) —CH$_2$CH$_2$CH$_2$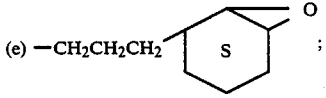

(f) —CH$_2$CH$_2$CH$_2$SH;
(g) —CH$_2$CH$_2$CH$_2$NHCH$_2$CH$_2$NHCH$_2$C$_6$H$_4$CH=CH$_2$.HCl;
(h) —CH$_2$CH$_2$CH$_2$$\overset{\oplus}{N}$(CH$_3$)$_2$C$_{18}$H$_{37}$Cl$^-$;
(i) —CH$_2$CH$_2$CH$_2$$\overset{\oplus}{N}$CH$_3$(C$_{12}$H$_{25}$)$_2$Cl$^-$;

(j) —(CH$_2$)$_3$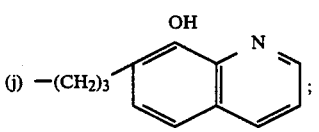

(k) alkyl group of less than twenty carbon atoms, and
(l) aryl group of less than twelve carbon atoms; R$^{vi}$ and R$^{vii}$ are each independently selected from a group consisting of alkyl groups of 1 to 3 carbon atoms; and
    (b) aminosilanes which are heterocyclic aminosilanes containing a group selected from the group consisting of

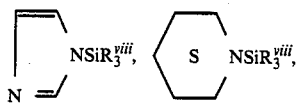 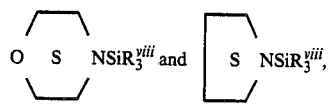

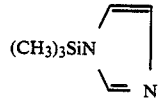

61. A method as claimed in claim 59 wherein the heterocyclic aminosilane is

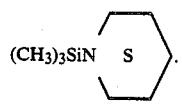

62. A method as claimed in claim 59 wherein the heterocyclic aminosilane is

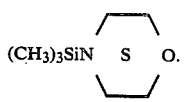

63. A method as claimed in claim 59 wherein the heterocyclic aminosilane is

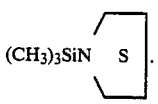

64. A method as claimed in claim 55 wherein the reactive silane of step (III) consists of thioethersilanes having the general formula $$R^{ix}{}_3SiSR^x$$

wherein each $R^{ix}$ is independently selected from alkyl groups having 1 to 6 carbon atoms and $R^x$ is selected from alkyl groups of 1 to 20 carbon atoms; aryl groups of less than twelve carbon atoms, hydrogen and vinyl; and $R^{xi}{}_3Si$— wherein each $R^{xi}$ is independently selected from alkyl groups having 1 to 3 carbon atoms.

65. A method as claimed in claim 64 wherein the thioether is $\{(CH_3)_3Si\}_2S$.

66. A method as claimed in claim 64 wherein the thioether is $(CH_3)_3SiSCH_3$.

67. A method as claimed in claim 64 wherein the thioether is $(CH_3)_3SiS(CH_2)_5CH_3$.

68. A method as claimed in claim 19 wherein the porous material is a silica gel.

69. A method as claimed in claim 19 wherein the porous material is alumina.

70. A method as claimed in claim 19 wherein the porous material is stannia.

71. A method as claimed in claim 19 wherein the porous material is titania.

72. A method as claimed in claim 31 wherein the reactive silane of step (III) has the general formula $$(R'O)_a(R'')_bSiQ_c$$

wherein R' is an alkyl radical having 1 to 4 carbon atoms or hydrogen; R" is an alkyl radical of 1 to 4 carbon atoms or phenyl; the value of a is 1, 2 or 3; the value of b is 0, 1 or 2; the value of c is 1 or 2 wherein wherein $R^{viii}$ has the same meaning as $R^{vi}$, and
(ii) thiodhensilanes having the general formula $R^{ix}{}_3$-$SiSR^x$ each $R^{ix}$ is independently selected from alkyl groups having 1 to 20 carbon atoms; aryl groups of less than twelve carbon atoms, hydrogen and vinyl; and $R^x$ is selected from alkyl groups of 1 to 6 carbon atoms and $R^{xi}{}_3Si$— wherein each $R^{xi}$ is independently selected from alkyl groups having from 1 to 3 carbon atoms.

56. A method as claimed in claim 55 wherein the reactive silane of step (III) is an N,N,N-trisubstituted amine having the general formula $$R^v SiNR^{vi}R^{vii}$$

wherein $R^v$ is independently selected from a group consisting of hydrogen, vinyl, and Q wherein Q is a radical selected from a group consisting of (a) $-CH_2CH_2CH_2OC(O)C(CH_3)=CH_2$;
(b) $-CH_2CH_2CH_2NH_2$;
(c) $-CH_2CH_2CH_2NHCH_2CH_2NH_2$;
(d)  $-CH_2CH_2CH_2OCH_2CH-CH_2$;
    with epoxide ring
(e) 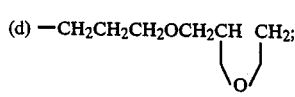
(f) $-CH_2CH_2CH_2SH$;
(g) $-CH_2CH_2CH_2NHCH_2CH_2NHCH_2C_6H_4CH=CH_2.HCl$;
(h) $-CH_2CH_2CH_2\overset{\oplus}{N}(CH_3)_2C_{18}H_{37}Cl^-$;
(i) $-CH_2CH_2CH_2\overset{\oplus}{N}CH_3(C_{12}H_{25})_2Cl^-$;
(j) 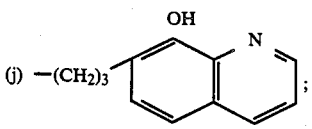

(k) alkyl group of less than twenty carbon atoms, and
(l) aryl group of less than twelve carbon atoms; $R^{vi}$ and $R^{vii}$ are each independently selected from a group consisting of alkyl groups of 1 to 3 carbon atoms.

57. A method as claimed in claim 56 wherein the N,N,N-trisubstituted aminosilane is $(CH_3)_3SiN(C_2H_5)_2$.

58. A method as claimed in claim 56 wherein the N,N,N-trisubstituted aminosilane is $(CH_3)_3SiN(CH_3)_2$.

59. A method as claimed in claim 55 wherein the reactive silane of step (III) is a N,N,N-trisubstituted aminosilane which is a heterocyclic aminosilane.

60. A method as claimed in claim 59 wherein the heterocyclic aminosilanes is a+b+c equals 4; Q is a radical selected from a group consisting of (a) —CH₂CH₂CH₂OC(O)C(CH₃)=CH₂;
(b) —CH₂CH₂CH₂NH₂;
(c) —CH₂CH₂CH₂NHCH₂CH₂NH₂;

(d) —CH₂CH₂CH₂OCH₂CH—CH₂;
  \\O/

(e) —CH₂CH₂CH₂—[cyclohexane ring with S and =O];

(f) —CH₂CH₂CH₂SH;
(g) —CH₂CH₂CH₂Cl;
(h) —CH₂CH₂CH₂NHCH₂CH₂NHCH₂C₆H₄CH=CH₂.HCl;
(i) —CH₂CH₂CH₂N⊕(CH₃)₂C₁₈H₃₇Cl⁻;
(j) —CH₂CH₂CH₂N⊕CH₃(C₁₂H₂₅)₂Cl⁻;

(k) —(CH₂)₃—[8-hydroxyquinoline group with OH and N];

(l) alkyl group of less than twenty carbon atoms, and
(m) aryl group of less than twelve carbon atoms.

73. A method as claimed in claim 72 wherein Q is —(CH₂)₃NH(CH₂)₂NH.

74. A method as claimed in claim 72 wherein Q is —(CH₂)₃NH₂.

75. A method as claimed in claim 72 wherein Q is

—(CH₂)₃OCH₂CHCH₂.
       └─O─┘

76. A method as claimed in claim 72 wherein Q is —(CH₂)₃N⊕(CH₃)₂C₁₈H₃₇Cl⁻.

77. A method as claimed in claim 72 wherein Q is —(CH₂)₉CH₃.

78. A method as claimed in claim 72 wherein Q is —(CH₂)₁₇CH₃.

79. A method as claimed in claim 31 wherein the reactive silane of step (III) is selected from a group consiting of N,N-disubstituted amidosilanes and N,O-disubstituted amides.

80. A method as claimed, in claim 79 wherein the N,N-disubstituted amido-silane is N-trimethylsilyl-N-methylacetamide.

81. A method as laimed in claim 79 wherein the N,O-disubstituted amidosilane is N,O-bis(trimethylsilyl)acetamide.

82. A method as claimed in claim 79 wherein the N,N-disubstituted amidosilane is N-trimethylsilyl,N-methyltrifluoroacetamide.

83. A method as claimed in claim 79 wherein the N,O-disubstituted amidosilane is N,O-bis(trimethylsilyl)trifluoroacetamide.

84. A method as claimed in claim 79 wherein the N,N-disubstituted amidosilane is N-hydrodimethylsilyl-N-methylacetamide.

85. A method as claimed in claim 79 wherein the N,N-disubstituted amidosilane is N-vinyldimethylsilyl-N-methylacetamide.

86. A method as claimed in claim 79 wherein the N,N-disubstituted amidosilane is N-drmethylalkylsilyl,N-methylacetamide wherein the alkyl group has from two to twenty carbon atoms.

87. A method as claimed in claim 79 wherein the N,N-disubstituted amidosilane is N-dimethylarylsilyl,N-methylacetamide wherein the aryl group has less than twelve carbon atoms.

88. A method as claimed in claim 31 wherein the porous material is a silica gel.

89. A method as claimed in claim 31 wherein the porous material is alumina.

90. A method as claimed in claim 31 wherein the porous material is stannia.

91. A method as claimed in claim 31 wherein the porous material is titania.

92. A method as claimed in claim 36 wherein the reactive silane of step (III) has the general formula (R'O)ₐ(R'')ᵦSiQ_c wherein R' is an alkyl radical having 1 to 4 carbon atoms or hydrogen; R'' is an alkyl radical of 1 to 4 carbon atoms or phenyl; the value of a is 1, 2 or 3; the value of b is 0, 1 or 2; the value of c is 1 or 2 wherein a+b+c equals 4; Q is a radical selected from a group consisting of (a) —CH₂CH₂CH₂OC(O)C(CH₃)=CH₂;
(b) —CH₂CH₂CH₂NH₂;
(c) —CH₂CH₂CH₂NHCH₂CH₂NH₂;

(d) —CH₂CH₂CH₂OCH₂CH—CH₂;
  \\O/

(e) —CH₂CH₂CH₂—[cyclohexane ring with S and =O];

(f) —CH₂CH₂CH₂SH;
(g) —CH₂CH₂CH₂Cl;
(h) —CH₂CH₂CH₂N⊕(CH₃)₂C₁₈H₃₇Cl⁻;
(i) —CH₂CH₂CH₂N⊕CH₃(C₁₂H₂₅)₂Cl⁻;

(j) —(CH₂)₃—[8-hydroxyquinoline group with OH and N];

(k) alkyl group of less than twenty carbon atoms, and
(l) aryl group of less than twelve carbon atoms.

93. A method as claimed in claim 92 wherein Q is —(CH₂)₃NH(CH₂)₂NH.

94. A method as claimed in claim 92 wherein Q is —(CH₂)₃NH₂.

95. A method as claimed in claim 92 wherein Q is

—(CH₂)₃OCH₂CHCH₂.
       └─O─┘

96. A method as claimed in claim 92 wherein Q is —(CH₂)₃N⊕(CH₃)₂C₁₈H₃₇Cl⁻.

97. A method as claimed in claim 36 wherein the reactive silane of step (III) has the general formula (R''O)ₐ(R'')ᵦSiQ_c wherein R is an alkyl radical having 1 to 4 carbon atoms or hydrogen; R' is an alkyl radical of 1 to 4 carbon atoms or phenyl; the value of a is 1, 2 or 3; the value of b is 0, 1 or 2; the value of c is 1 or 2 wherein a+b+c equals 4; Q is a radical selected from a group consisting of (a) —CH$_2$CH$_2$CH$_2$OC(O)C(CH$_3$)=CH$_2$;

(b) —CH$_2$CH$_2$CH$_2$OCH$_2$CHCH$_2$;
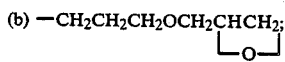

(c) 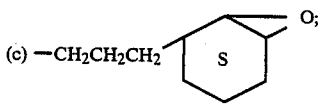

(d) —CH$_2$CH$_2$CH$_2$SH;
(e) —CH$_2$CH$_2$CH$_2$Cl;

(f) —CH$_2$CH$_2$CH$_2$N$^⊕$(CH$_3$)$_2$C$_{18}$H$_{37}$Cl$^-$;

(q) —CH$_2$CH$_2$CH$_2$N$^⊕$CH$_3$(C$_{12}$H$_{25}$)$_2$Cl$^-$;

(h) 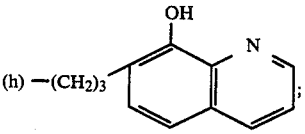

(i) alkyl group of less than twenty carbon atoms; and
(j) aryl group of less than twelve carbon atoms.

98. A method as claimed in claim 97 wherein Q is —CH$_2$CH$_2$CH$_2$OC(O)C(CH$_3$)=CH$_2$.

99. A method as claimed in claim 97 wherein Q is

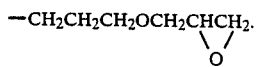

100. A method as claimed in claim 97 wherein Q is

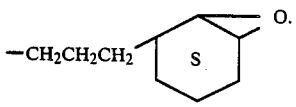

101. A method as claimed in claim 97 wherein Q is —CH$_2$CH$_2$CH$_2$SH.

102. A method as claimed in claim 97 wherein Q is —CH$_2$CH$_2$CH$_2$Cl.

103. A method as claimed in claim 97 wherein Q is —CH$_2$CH$_2$CH$_2$N$^⊕$(CH$_3$)$_2$C$_{18}$H$_{37}$Cl$^-$.

104. A method as claimed in claim 97 wherein Q is —CH$_2$CH$_2$CH$_2$N$^⊕$(C$_{12}$H$_{25}$)$_2$Cl$^-$.

105. A method as claimed in claim 97 wherein Q is

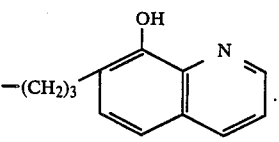

106. A method as claimed in claim 36 wherein the porous material is a silica gel.

107. A method as claimed in claim 36 wherein the porous material is alumina.

108. A method as claimed in claim 36 wherein the porous material is stannia.

109. A method as claimed in claim 36 wherein the porous material is titania.

* * * * *